US012603437B2

(12) United States Patent
Kawamura

(10) Patent No.: US 12,603,437 B2
(45) Date of Patent: Apr. 14, 2026

(54) ANTENNA

(71) Applicant: Sony Group Corporation, Tokyo (JP)

(72) Inventor: Takashi Kawamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 209 days.

(21) Appl. No.: 18/570,070

(22) PCT Filed: Dec. 28, 2021

(86) PCT No.: PCT/JP2021/048951
§ 371 (c)(1),
(2) Date: Dec. 14, 2023

(87) PCT Pub. No.: WO2022/269955
PCT Pub. Date: Dec. 29, 2022

(65) Prior Publication Data

US 2024/0275056 A1 Aug. 15, 2024

(30) Foreign Application Priority Data

Jun. 23, 2021 (JP) ................................ 2021-103942

(51) Int. Cl.
*H01Q 9/28* (2006.01)
*H01Q 1/04* (2006.01)

(52) U.S. Cl.
CPC ................. *H01Q 9/28* (2013.01); *H01Q 1/04* (2013.01)

(58) Field of Classification Search
CPC ................................... H01Q 1/04; H01Q 9/28
See application file for complete search history.

(56) References Cited

U.S. PATENT DOCUMENTS 3,364,491 A 1/1968 Stohr
5,521,610 A * 5/1996 Rodal .................... H01Q 23/00 343/797

(Continued)

FOREIGN PATENT DOCUMENTS

CA 401693 A 12/1941
CN 207542389 U 6/2018

(Continued)

OTHER PUBLICATIONS

International Search Report and Written Opinion mailed on Mar. 22, 2022, received for PCT Application PCT/JP2021/048951, filed on Dec. 28, 2021, 8 pages including English Translation.

(Continued)

*Primary Examiner* — Tho G Phan
(74) *Attorney, Agent, or Firm* — XSENSUS LLP

(57) ABSTRACT

An antenna for wireless communication via a lossy medium, a structure thereof is optimized to improve transmission characteristics such as a transmission coefficient. The antenna includes at least one pair of electrodes and a sheath portion. The sheath portion includes a wiring electrically connecting each of the at least one pair of electrodes and a corresponding power supply terminal. The sheath portion is also referred to as a sheath. In this antenna, a minimum diameter of the electrode is larger than a width of the wiring included in the sheath portion. A shape of each of the at least one pair of electrodes is, for example, substantially spherical.

18 Claims, 15 Drawing Sheets

(56) References Cited

U.S. PATENT DOCUMENTS

| | | | | |
|---|---|---|---|---|
| 6,424,309 | B1 * | 7/2002 | Johnston | H01Q 13/10<br>343/795 |
| 7,102,574 | B2 * | 9/2006 | Otaka | H01Q 9/40<br>343/908 |
| 7,327,318 | B2 * | 2/2008 | Frank | H01Q 9/285<br>343/745 |
| 10,985,464 | B2 * | 4/2021 | Jain | H01Q 1/273 |
| 11,769,952 | B2 * | 9/2023 | Huang | H01Q 1/523<br>343/818 |

FOREIGN PATENT DOCUMENTS

| | | | |
|---|---|---|---|
| JP | 2005124030 | A | 5/2005 |
| JP | 2008-211778 | A | 9/2008 |
| JP | 2008217778 | A | 9/2008 |
| JP | 2019-533260 | A | 11/2019 |

OTHER PUBLICATIONS

Sato et al., “Dipole Antenna With Sheath-Cover for Seawater Use”, 2017 International Symposium on Antennas and Propagation (ISAP), 1376, 2017, pp. 1-2.

* cited by examiner a b c d a b a b

ANTENNA

CROSS-REFERENCE TO RELATED APPLICATIONS

The present application is based on PCT filing PCT/JP2021/048951, filed Dec. 28, 2021, which claims priority from Japanese Patent Application No. 2021-103942, filed Jun. 23, 2021, the entire contents of each are incorporated herein by reference.

TECHNICAL FIELD

The present technology relates to an antenna. Specifically, the present technology relates to an antenna for wireless communication via a lossy medium.

BACKGROUND ART

As an antenna for wireless communication via a lossy medium, a half-sheath dipole antenna in which a part of an element is exposed has been proposed. It is known that this half-sheath dipole antenna has higher impedance characteristics than a dipole antenna without a sheath, and has a superior transmission coefficient compared to a full-sheath dipole antenna (see, for example, Non-Patent Document 1).

CITATION LIST

Non-Patent Document

Non-Patent Document 1: H. Sato et al., "Dipole antenna with sheath-cover for seawater use," 2017 International Symposium on Antennas and Propagation (ISAP), 1376, pp. 1-2 (2017).

SUMMARY OF THE INVENTION

Problems to be Solved by the Invention

For the half-sheath dipole antenna described above, the transmission characteristics are analyzed by electromagnetic field simulation, but the elucidation of the principle is insufficient, and an optimum structure is not necessarily clear.

The present technology has been made in view of such a situation, and an object thereof is to optimize a structure of an antenna for wireless communication via a lossy medium to improve transmission characteristics.

Solutions to Problems

The present technology has been made to solve the above-described problems, and a first aspect of the present technology is an antenna including: at least one pair of electrodes, and a sheath portion enclosing wiring that electrically connects each of the at least one pair of electrodes and a corresponding power supply terminal; in which a minimum diameter of the electrode is larger than a width of the wiring. Therefore, this brings about an effect of making the minimum diameter of the electrode connected to the wiring enclosed in the sheath portion larger than the width of the wiring. As will be described later, the diameter of the electrode is preferably large.

In addition, in the first aspect, a distance between the at least one pair of electrodes may be longer than the minimum diameter of the electrode. As will be described later, the distance between the electrodes is preferably wide.

Furthermore, in the first aspect, each of the at least one pair of electrodes may have a substantially spherical shape, a spheroidal shape, or a polyhedral shape. As will be described later, the shape of the electrode is preferably closer to a spherical shape.

In addition, in the first aspect, the sheath portion may have a columnar shape extending in a direction connecting the at least one pair of electrodes. Moreover, the sheath portion may have a shape branching from the columnar shape.

Furthermore, in the first aspect, the sheath portion may include air or pure water therein. In addition, the sheath portion may include a material therein having conductivity of less than 1 S/m.

Moreover, in the first aspect, each of the at least one pair of electrodes may include a coating film on a surface thereof.

Furthermore, in the first aspect, a magnitude of impedance at an operating frequency between each of the at least one pair of electrodes and an external medium is preferably smaller than an impedance in a case where the coating film is not included.

In addition, in the first aspect, each of the at least one pair of electrodes may include a material therein having conductivity of less than 1 S/m.

Moreover, in the first aspect, each of the at least one pair of electrodes may include a cavity therein. In this case, each of the at least one pair of electrodes may include at least one hole penetrating the cavity.

Furthermore, in the first aspect, a transformer in which a number of windings of a coil connected to the power supply terminal is smaller than a number of windings of another coil may be further included. Therefore, this brings about an effect of matching impedance.

In addition, in the first aspect, a switching-type power amplifier connected to the power supply terminal may be further included. Therefore, this brings about an effect of matching impedance.

MODE FOR CARRYING OUT THE INVENTION

Hereinafter, modes for carrying out the present technology (hereinafter, referred to as embodiments) will be described. The description will be given in the following order.

1. Embodiment (Antenna)
2. Application Example (Connection with Wireless Device)

1. Embodiment

[Wireless Communication System]

Figure 1:
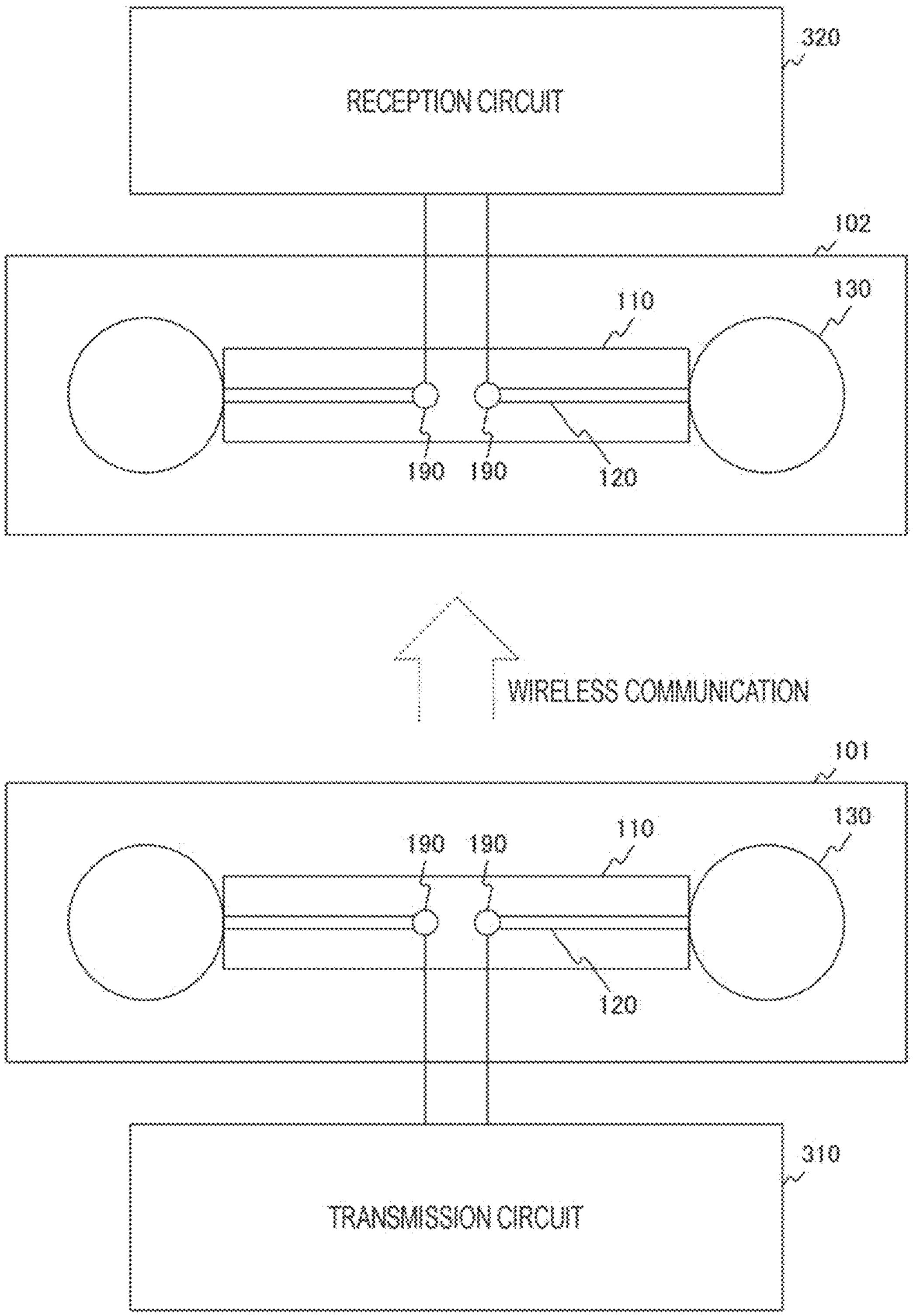
FIG. 1 is a diagram illustrating an example of an overall configuration of a wireless communication system according to an embodiment of the present technology.

FIG. 1 is a diagram illustrating an example of an overall configuration of a wireless communication system according to an embodiment of the present technology.

The wireless communication system includes a transmission circuit 310 and a reception circuit 320 as a wireless device that perform wireless communication. That is, the transmission circuit 310 transmits a radio signal to the reception circuit 320, and the reception circuit 320 receives the radio signal from the transmission circuit 310. The transmission circuit 310 and the reception circuit 320 include antennas 101 and 102, respectively, and perform wireless communication via the antennas 101 and 102.

Wireless communication between the transmission circuit 310 and the reception circuit 320 is performed via a lossy medium. Here, as the lossy medium, for example, seawater, a human body, or the like is assumed.

Each of the antennas 101 and 102 includes a pair of electrodes 130 and a sheath portion 110. The sheath portion 110 includes a pair of wirings 120 electrically connecting the electrode 130 and the power supply terminal 190 corresponding to the electrode 130. Note that the sheath portion 110 is also referred to as a sheath.

The sheath portion 110 has, for example, a columnar shape extending in a direction connecting between the pair of electrodes 130. As the columnar shape, a cylinder or a prism shape is assumed. Furthermore, as will be described later, the shape may be branched from the middle of the columnar shape.

The sheath portion 110 may include a low-loss dielectric therein. As the low-loss dielectric, for example, air, pure water, resin, glass, ceramic material, and the like are assumed. Note that the low-loss dielectric inside the sheath portion 110 may include a plurality of materials.

Here, as the low-loss dielectric inside the sheath portion 110, air has the lowest loss, but is not suitable in an environment with a high water pressure. On the other hand, as the low-loss dielectric inside the sheath portion 110, pure water is more suitable in an environment with a high water pressure.

In addition, in a case where a resin, glass, a ceramic material, or the like is adopted as the low-loss dielectric inside the sheath portion 110, consideration must be taken in order that a medium from the outside such as seawater does not permeate and come into contact with the wiring 120. However, as long as there is no contact with the wiring 120, a medium from the outside may permeate inside the low-loss dielectric.

Conductivity of the low-loss dielectric inside the sheath portion 110 is less than 1 S/m, and particularly desirably less than 0.1 S/m.

[Electrode]

Figure 2:
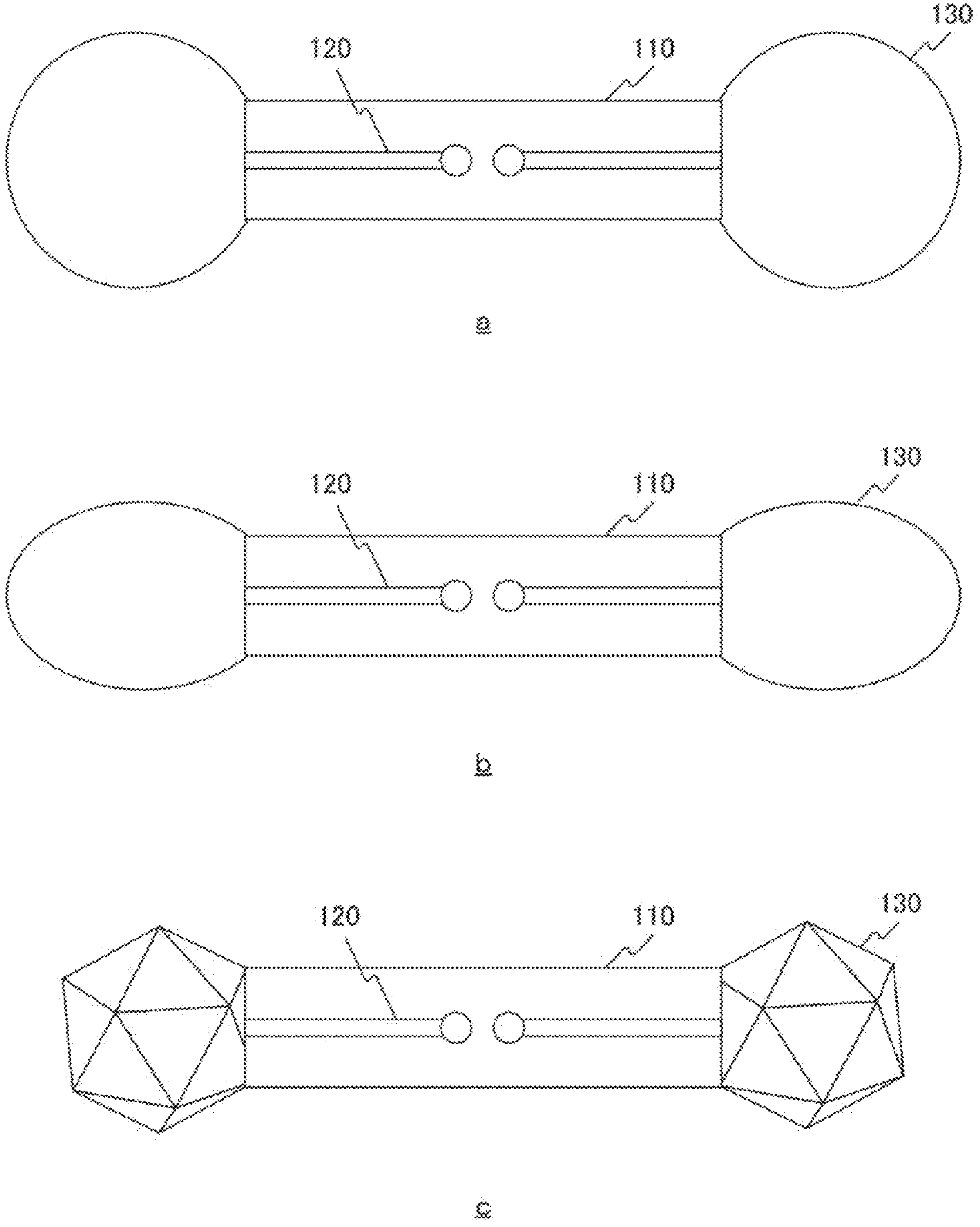
FIG. 2 is a diagram illustrating examples of shapes of an electrode 130 of antennas 101 and 102 according to the embodiment of the present technology.

FIG. 2 is a diagram illustrating examples of shapes of the electrode 130 of the antennas 101 and 102 according to the embodiment of the present technology.

The shape of the electrode 130 is desirably spherical as illustrated in a of FIG. 2, but a shape close to a sphere is sufficient. For example, as illustrated in b of FIG. 2, the shape may be a shape of a spheroid.

In addition, the surface may not be smooth for the convenience of manufacturing, and may have a polyhedral shape as illustrated in c of FIG. 2. In that case, the number of faces is desirably 20 or more, but not necessarily 20 or more, and the shape does not need to be a regular polyhedron.

Regardless of the shape, the minimum diameter of the electrode 130 is desirably larger than the width of the wiring 120.

As a material of the electrode 130, for example, a metal having high corrosion resistance such as copper (Cu), aluminum (Al), gold (Au), platinum (Pt), and silver (Ag), or an alloy thereof, or the like is assumed.

In addition, a dielectric may be provided inside the electrode 130. In this case, the dielectric inside the electrode 130 may include a plurality of materials. At this time, conductivity of the dielectric inside the electrode 130 is less than 1 S/m.

A coating film may be formed on a surface of the electrode 130 by applying a coating for corrosion prevention. The type of coating may be any of a metal coating, an inorganic coating, or an organic coating.

In a case where the surface of the electrode 130 is coated with metal, for example, plating, metal spraying, metal diffusion, or the like is performed. As the metal material in this case, it is desirable to use a material having high conductivity.

In a case where the surface of the electrode 130 is coated with an inorganic substance, coating or lining of, for example, glass, enamel, mortar, concrete, or the like is performed. In addition, in a case where the surface of the electrode 130 is coated with an organic substance, coating or lining of, for example, paint, rubber, plastic, or the like is performed. However, it is preferable to make the coating film as thin as possible or to select a material having as high dielectric constant as possible so that the electrostatic capacitance generated by the coating film becomes sufficiently large. Specifically, a magnitude of an impedance at the operating frequency between the electrode and an external medium is desirably smaller than an impedance in a case where the coating film is not provided on the surface of the electrode 130.

Figure 3:
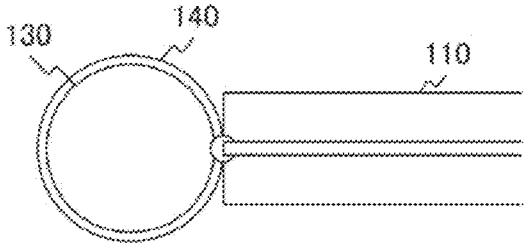
FIG. 3 is a diagram illustrating examples of structures of a wiring connection inside the electrode 130 according to the embodiment of the present technology.
Figure 3:
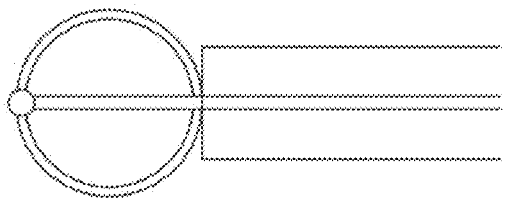
Figure 3:
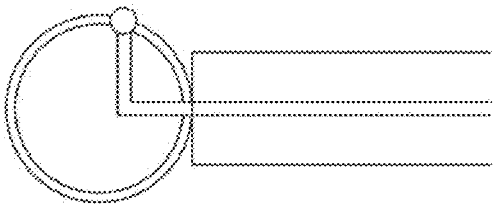
Figure 3:
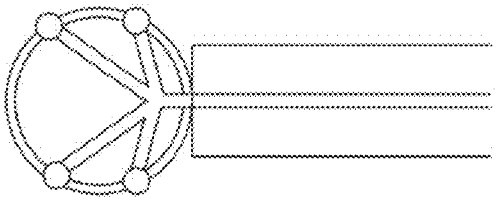

FIG. 3 is a diagram illustrating examples of structures of a wiring connection inside the electrode 130 according to the embodiment of the present technology.

The wiring 120 connected to the power supply terminal 190 and the electrode 130 may be connected in any way. That is, the connection may be made at a frontmost position as illustrated in a of FIG. 3, or may be made at an innermost position as illustrated in b of FIG. 3. Moreover, as illustrated in c of FIG. 3, the connection may be made between the frontmost position and the innermost position. Furthermore, as illustrated in d of FIG. 3, the connection may be made at a plurality of positions of the electrode 130.

Figure 4:
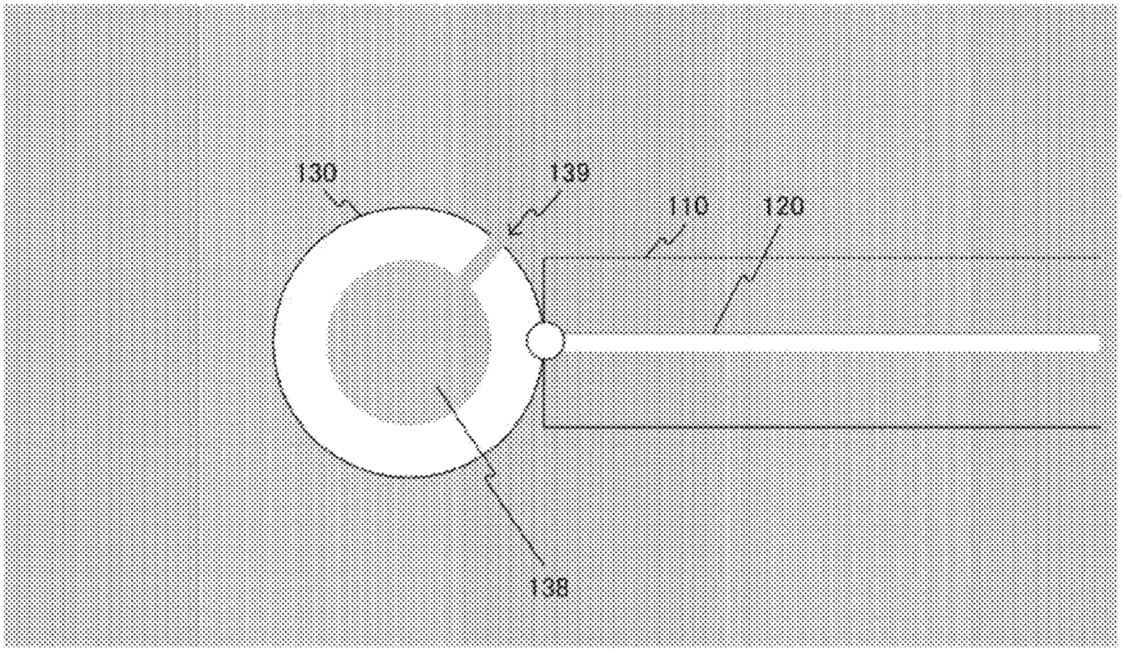
FIG. 4 is a diagram illustrating an example of a structure of a cavity inside the electrode 130 according to the embodiment of the present technology.

FIG. 4 is a diagram illustrating an example of a structure of a cavity inside the electrode 130 according to the embodiment of the present technology.

In order to avoid deformation or the like due to a pressure difference between the inside and the outside of the electrode 130, a cavity 138 may be provided inside the electrode 130, and at least one hole 139 penetrating the cavity 138 may be provided. Through the hole 139, an external medium such as seawater enters the cavity 138. At this time, it is desirable to secure a low-loss material inside in the vicinity of the electrode 130.

A certain number of the holes 139 may be provided through the cavity 138. However, when the number of the holes 139 is too large, the surface area of the electrode 130 becomes small, and thus the electric field may be partially concentrated and lead to loss.

Figure 5:
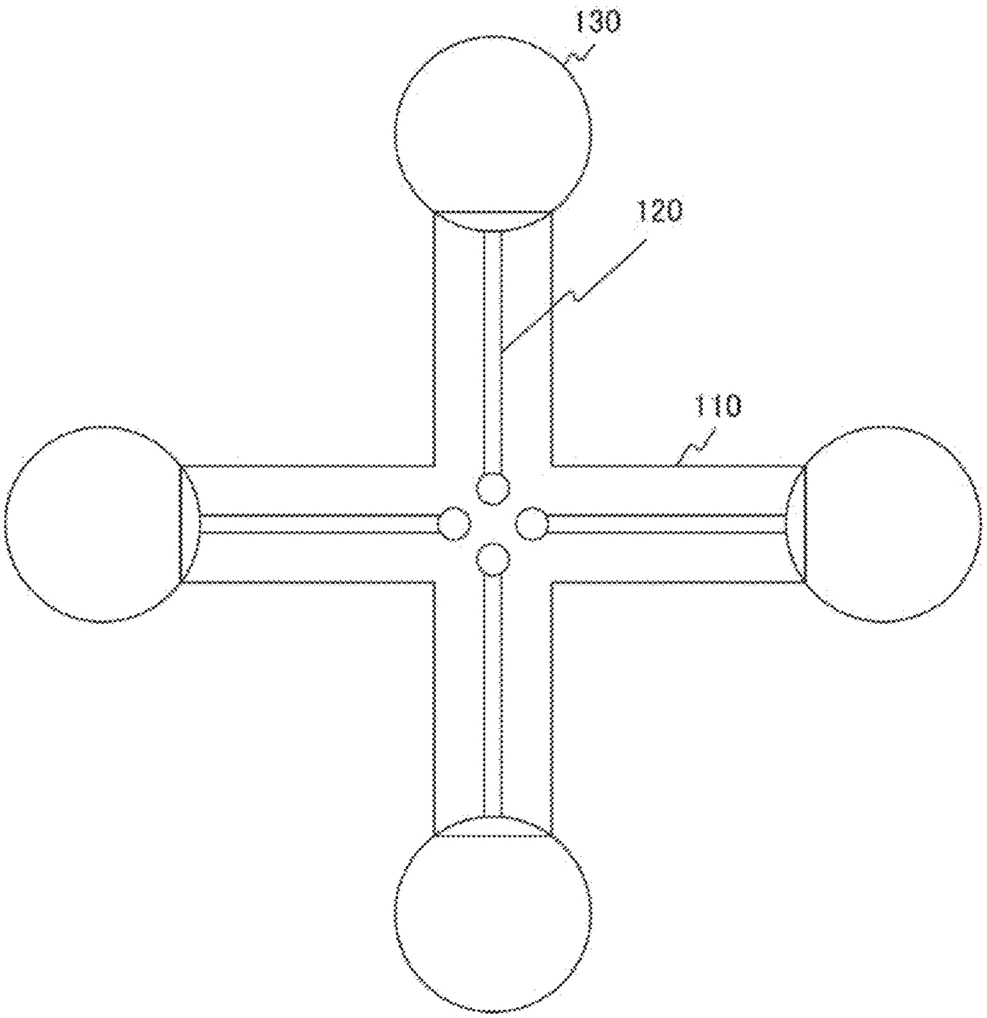
FIG. 5 is a diagram illustrating an example in which two pairs of electrodes 130 are provided in the embodiment of the present technology.

FIG. 5 is a diagram illustrating an example in which two pairs of electrodes 130 are provided in the embodiment of the present technology.

In this example, configuration is such that an electrode 130 is provided at each of the four ends of the cross-shaped sheath portion 110, and wiring 120 electrically connected to a power supply terminal 190 corresponding to each electrode 130 is enclosed inside.

By providing the two pairs of electrodes 130 in this manner, application to circularly polarized waves and shared polarized waves is possible.

[Characteristic Analysis]

Figure 6:
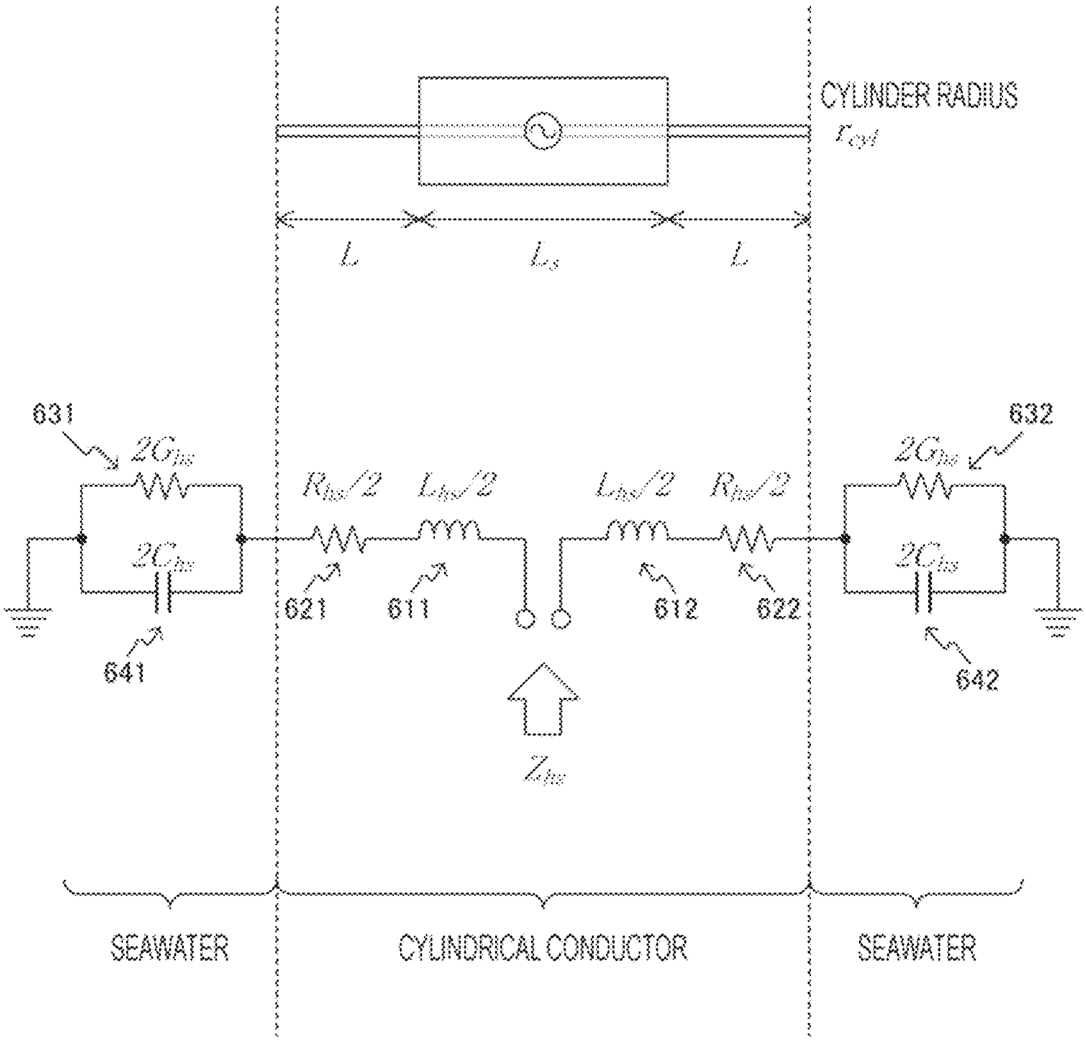
FIG. 6 is a diagram illustrating an equivalent circuit of the antennas 101 and 102 according to the embodiment of the present technology.

FIG. 6 is a diagram illustrating an equivalent circuit of the antennas 101 and 102 according to the embodiment of the present technology.

Here, the portion corresponding to the electrode 130 is formed in a cylindrical shape, and the impedance is formulated. The equivalent circuit of the antennas 101 and 102 assumes an antenna shorter than a wavelength in a lossy medium. A length corresponding to the sheath portion 110 is denoted by Ls, and a length corresponding to the electrode 130 is denoted by L. In addition, a radius of a cylindrical conductor corresponding to the electrode 130 is defined as rcyl.

The antenna portion of the cylindrical conductor is considered to be a series connection of an inductance 611 or 612 and a resistance 621 or 622. Here, reactance of the inductance 611 or 612 is Lhs/2. In addition, a resistance value of each resistance 621 or 622 is set to Rhs/2.

Furthermore, an external medium such as seawater is considered to be a parallel connection of a resistance 631 or

632 and a capacitance 641 or 642. Here, a conductance of the resistance 631 or 632 is set to 2Ghs. In addition, an electrostatic capacitance of the capacitance 641 or 642 is set to 2Chs.

In this case, the impedance Zhs as viewed from the power supply terminal 190 is obtained by the following equation.

$$Z_{hs} = R_{hs} + \frac{G_{hs}}{G_{hs}^2 + \omega^2 C_{hs}^2} + j\omega\left(L_{hs} - \frac{C_{hs}}{G_{hs}^2 + \omega^2 C_{hs}^2}\right) \approx \frac{G_{hs}}{G_{hs}^2 + \omega^2 C_{hs}^2} + j\omega L_{hs} \quad \text{[Math. 1]}$$

Here, in a high-loss medium such as seawater, the relationship $Ghs^2 >> \omega^2 Chs^2$, that is, $Ghs^2/(\omega^2 Chs^2) = \sigma^2/(\omega^2 \varepsilon'^2) = \tan^2\delta >> 1$ is established, and thus the following equation is derived.

$$Z_{hs} \approx 1/G_{hs} + j\omega L_{hs} \quad \text{[Math. 2]}$$

It can be seen from the above equation that the real part of the impedance Zhs is expressed as the inverse of the substantial conductance Ghs.

In addition, in a case where the electrodes 130 at both ends of the sheath portion 110 are separated so that a charge distribution is not affected by electric fields of each other, conductance between the electrodes 130 is half of that in the case of a single electrode.

Therefore, the conductance Ghs is given by the following equation. However, rell is defined as a half value of a minor axis of an ellipse having the same area as a cylinder having a length l and a radius rcyl and having focal point coordinates of (±l/2,0).

$$G_{hs} \approx 2\pi\sigma l\left\{\ln\left(\frac{\sqrt{(l/2)^2 + r_{ell}^2} + l/2}{\sqrt{(l/2)^2 + r_{ell}^2} - l/2}\right)\right\}^{-1} = \pi\sigma l\left(\ln\frac{\pi l}{4r_{cyl}}\right)^{-1} \quad \text{[Math. 3]}$$

Accordingly, the real part of the impedance Zhs is given by the following equation.

$$\mathrm{Re}(Z_{hs}) \approx \frac{1}{\pi\sigma L}\ln\frac{\pi L}{4r_{cyl}} \quad \text{[Math. 4]}$$

That is, the smaller the radius rcyl of the cylindrical conductor corresponding to the electrode 130 is, the larger the real part of the impedance becomes, and the easier impedance matching becomes. However, as the impedance increases, current decreases under a condition of constant power, and a charge of the electrode 130 decreases. Therefore, the electric field weakens, which reduces the efficiency. In addition, when the impedance increases, the surrounding electric field does not change under a condition of a constant current, but the voltage increases, and thus the input power increases and the efficiency decreases. Therefore, under any condition, the efficiency decreases as the radius rcyl decreases. Thus, it can be seen that the diameter of the electrode 130 is preferably large.

Figure 7:
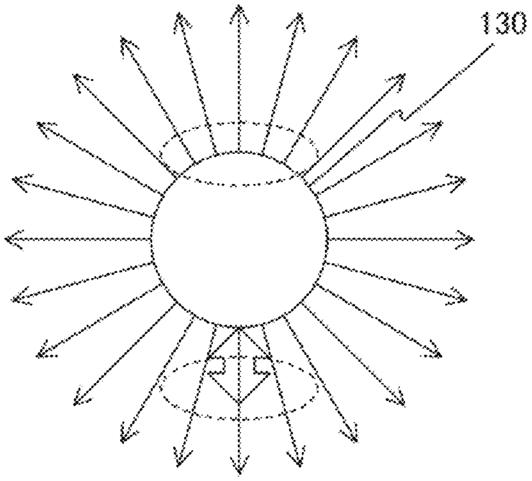
FIG. 7 is a diagram illustrating examples of electric fields generated around the electrode 130 according to the embodiment of the present technology.
Figure 7:
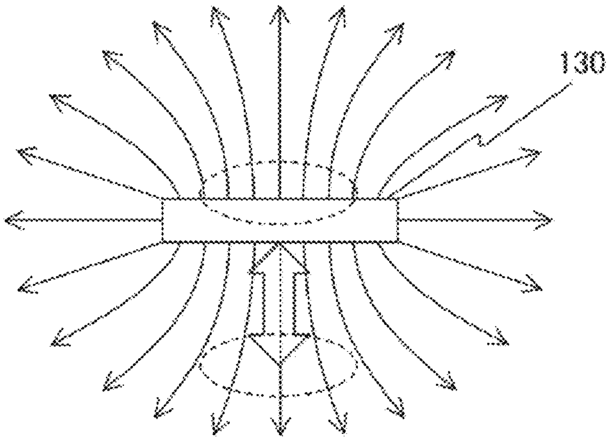

FIG. 7 is a diagram illustrating an example of an electric field generated around the electrode 130 according to the embodiment of the present technology.

Electric fields around a conductor having the same electric charge are considered to be isotropic at sufficiently separated locations compared to the size of the conductor, regardless of the shape of the conductor. That is, in a case of objects having identical surface areas, since the charge density of the surfaces is the same, the density of the lines of electric force near the conductor surfaces, that is, the electric field intensity is the same.

On the other hand, when a location separated away from the conductors is considered, the electric field intensity decreases in inverse proportion to the square of the distance in the sphere illustrated in a of FIG. 7. On the other hand, in the cylinder illustrated in b of FIG. 7, a decrease in the electric field intensity is gentle in the vicinity of the conductor. Therefore, the loss increases in the cylinder. Therefore, it can be seen that the shape of the electrode 130 is preferably spherical.

Figure 8:
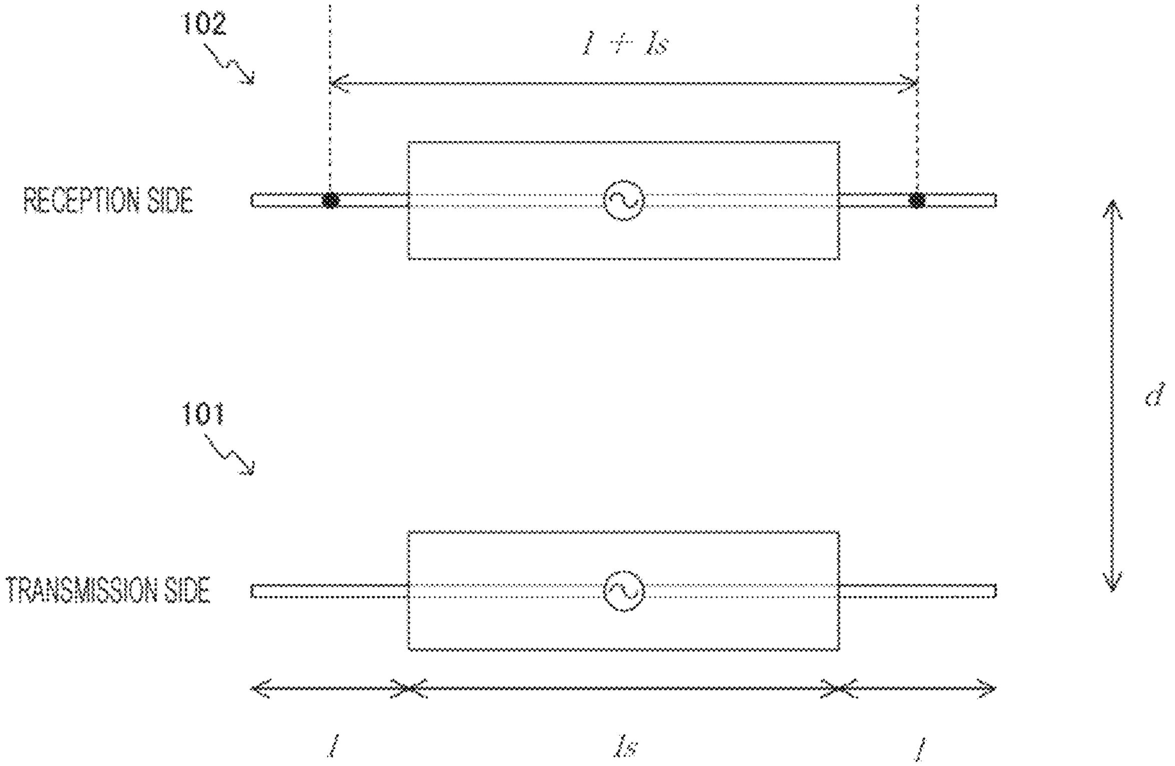
FIG. 8 is a diagram illustrating an arrangement example of the antennas 101 and 102 according to the embodiment of the present technology.

FIG. 8 is a diagram illustrating an arrangement example of the antennas 101 and 102 according to the embodiment of the present technology.

Under the condition of the distance d between the antennas 101 and 102, a transmission coefficient t between the antennas is expressed by the following formula. Note that Kcorr is a correction coefficient for correcting an electrostatic field distribution to a high-frequency electric field distribution including a contribution of a displacement current and a radiation.

$$\tau \approx \frac{K_{corr}^2}{\omega^2 - |Z|^2} |\zeta(0, d) - \zeta(l + l_s, d)|^2 \quad \text{[Math. 5]}$$

Here, ζ is given by the following equation.

$$\zeta(x, y) = \frac{1}{4\pi\varepsilon l} \ln\left( \frac{\sqrt{(x + l/2)^2 + y^2} + x + l/2}{\sqrt{(x - l/2)^2 + y^2} + x - l/2} \right) \quad \text{[Math. 6]}$$

Therefore, the transmission coefficient τ is inversely proportional to the square of the impedance. That is, the lower the impedance, the larger the transmission coefficient τ. The transmission coefficient indicates the power efficiency at the time of ideal transmission/reception matching, and thus it can be seen that the lower the impedance, the better the power efficiency.

Figure 9:
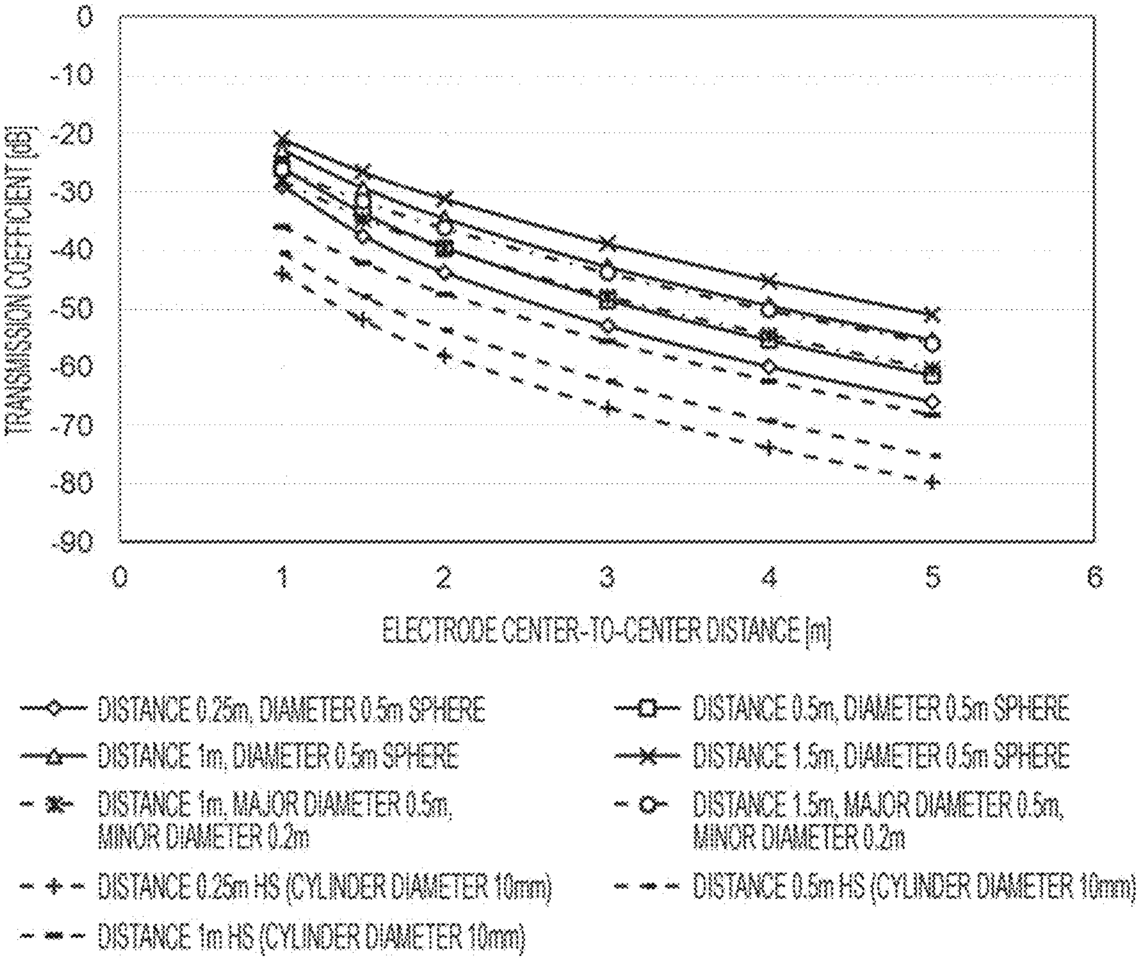
FIG. 9 is a diagram illustrating an example of a relationship between a center-to-center distance and a transmission coefficient of the electrode 130 according to the embodiment of the present technology.
Figure 10:
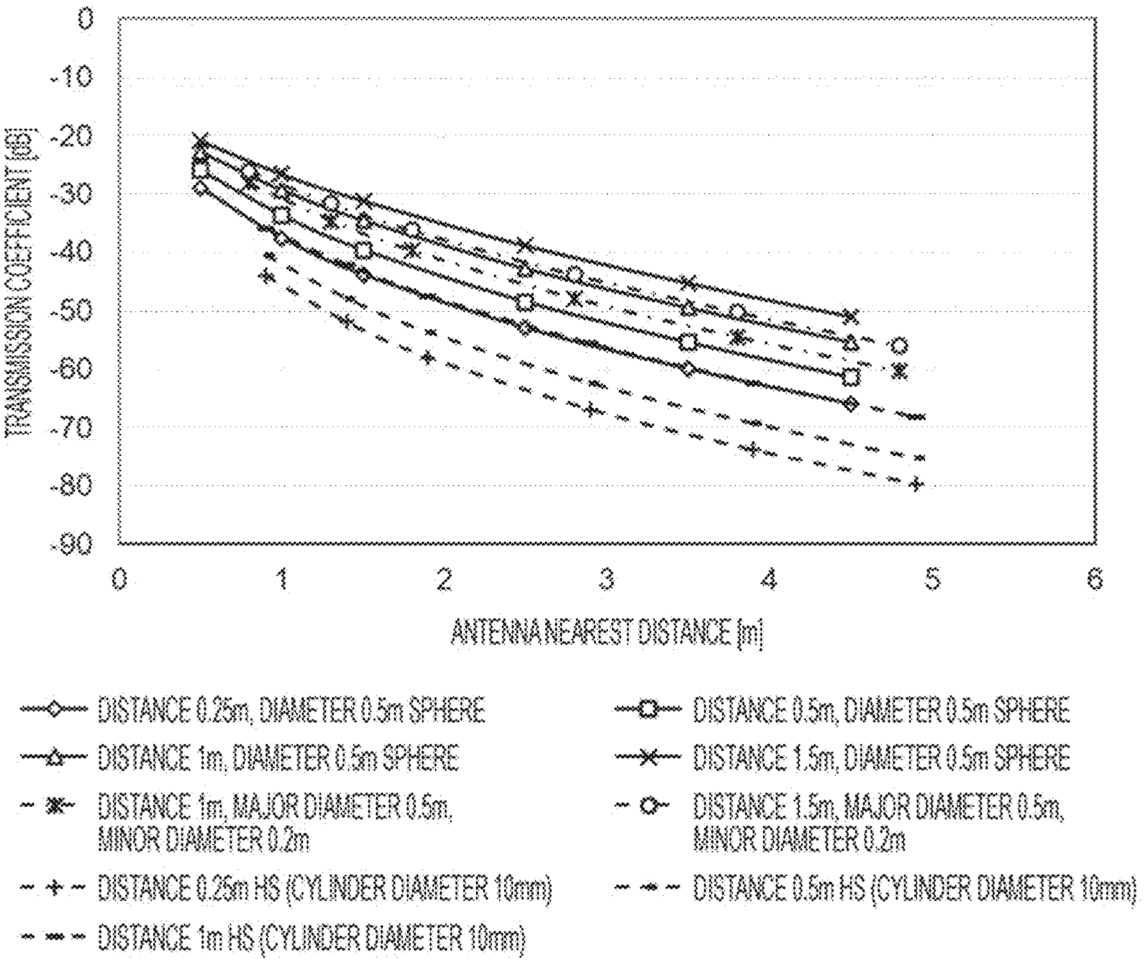
FIG. 10 is a diagram illustrating an example of a relationship between a nearest distance and a transmission coefficient of the electrode 130 according to the embodiment of the present technology.

FIG. 9 is a diagram illustrating an example of a relationship between a center-to-center distance and a transmission coefficient of the electrode 130 according to the embodiment of the present technology. FIG. 10 is a diagram illustrating an example of a relationship between a nearest distance and a transmission coefficient of the electrode 130 according to the embodiment of the present technology.

These results were obtained by performing full-wave analysis using the finite element method (HFSS) at 10 KHz in seawater (dielectric constant εr=80, conductivity σ=4 S/m). The diameter of the sheath portion 110 was 0.1 m, and the distance between the electrodes 130 was variable. Copper is assumed as a material of the electrode 130. Physical property values of the sheath portion 110 were dielectric constant εr=80 and conductivity σ=0.01 S/m.

Here, three types of shapes of the electrode 130 are assumed: (1) a sphere having a diameter of 0.5 m, (2) a spheroid having a major diameter of 0.5 m and a minor diameter of 0.2 m, and (3) a cylinder (in the figure, HS) having a length of 0.5 m and a diameter of 0.01 m. The first two correspond to the present embodiment, and the second corresponds to a conventional half-sheath dipole antenna.

When these are compared, the transmission coefficient is larger in the order of (1) sphere, (2) spheroid, and (3) cylinder in both the center-to-center distance of the electrode 130 and the nearest distance of the electrode 130. Therefore, even from the analysis result, it is desirable that the electrode 130 be spherical.

In addition, from this result, it is understood that a wider distance is better when the distances between the electrodes 130 are compared. Specifically, the distance between the electrodes 130 is desirably longer than the minimum diameter of the electrodes 130.

In addition, as compared with the conventional half-sheath dipole antenna, in the present embodiment in which the electrode is substantially spherical, an improvement of about 15 dB is observed. This corresponds to an area expansion to about λ/3 in the far field region with the same power, and corresponds to a reduction in power consumption by about 15 dB (1/30 or less) in the same communication area.

Figure 11:
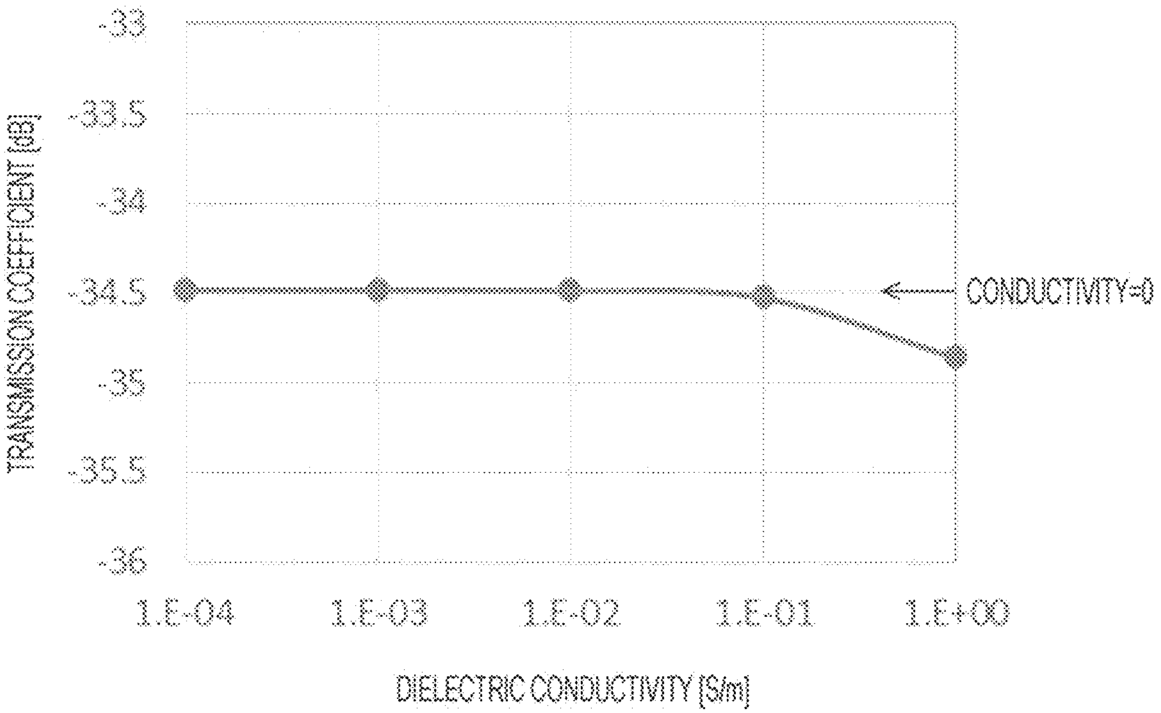
FIG. 11 is a diagram illustrating an example of a relationship between conductivity and a transmission coefficient of the electrode 130 according to the embodiment of the present technology.

FIG. 11 is a diagram illustrating an example of a relationship between conductivity and a transmission coefficient of the electrode 130 according to the embodiment of the present technology.

Here, as the structure of the electrode 130, it is assumed that a thin film is formed on a surface of the dielectric, and the analysis result in a case where conductivity of the dielectric is changed while εr'=80 is fixed is shown. As a result, it can be seen that even when the conductivity is changed, the transmission coefficient is not greatly affected as long as the conductivity is less than 0.1 S/m. Therefore, there is almost no influence as long as conductivity is in a range of tap water (0.01 S/m) or so, and it is considered that the material of the dielectric does not need to have a particularly low loss.

Figure 12:
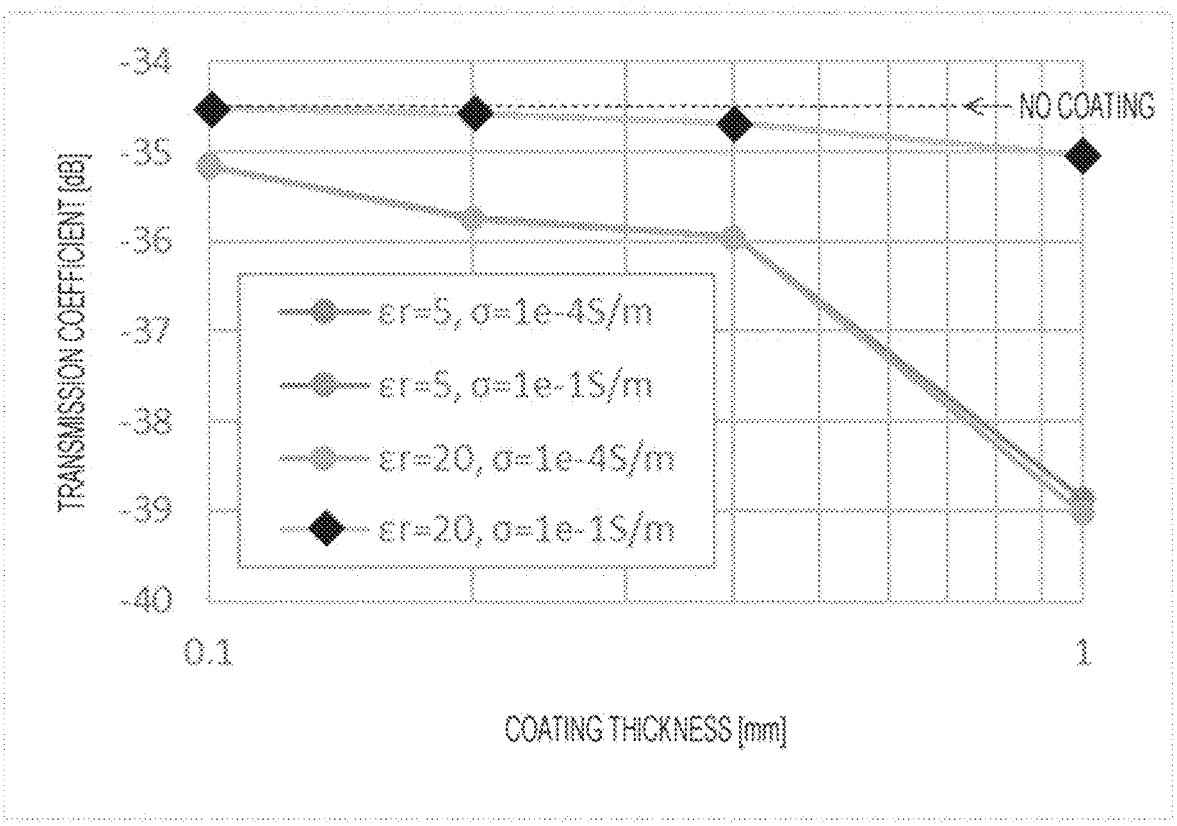
FIG. 12 is a diagram illustrating an example of a relationship between a coating thickness and a transmission coefficient of the electrode 130 according to the embodiment of the present technology.

FIG. 12 is a diagram illustrating an example of a relationship between a coating thickness and a transmission coefficient of the electrode 130 according to the embodiment of the present technology.

Here, as the structure of the electrode 130, it is assumed that the surface of the conductor is coated with a dielectric, and the dielectric constant εr and the conductivity σ are changed. It is assumed that the electrode 130 is spherical with a radius of 0.25 m, the radius of the sheath portion 110 is 0.05 m, the length of the sheath portion 110 is 1 m, the radius of the wiring 120 is 5 mm, and the distance between the antenna 101 and the antenna 102 is 2 m.

As a result, it can be seen that the thinner the coating film, the less the deterioration. For example, when the conductivity σ=0.1 S/m, even a coating film having a thickness of 1 mm deteriorates only about 0.5 dB. On the other hand, in a case of low conductivity, the degradation amount increases.

2. Application Examples

[Impedance Countermeasures]

As described above, it is assumed that the antenna of the embodiment of the present technology is used under a low impedance condition. Therefore, in a case of using an antenna with a very low impedance of, for example, around 0.1 ohms, matching with a standardly used 50 ohm system becomes a problem. Therefore, in the following, two methods will be described as countermeasures against impedance reduction.

Figure 13:
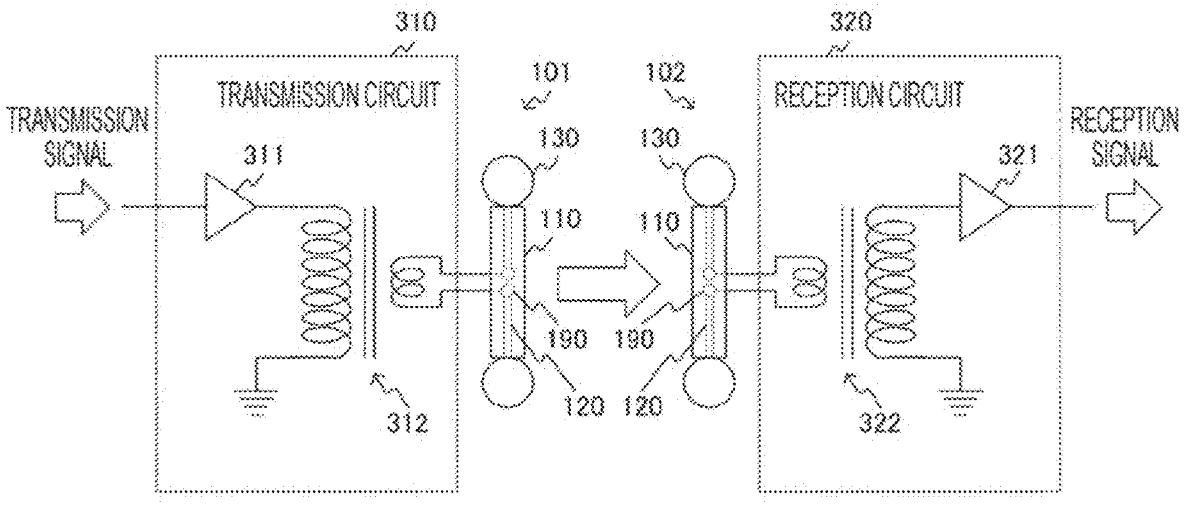
FIG. 13 is a diagram illustrating a first impedance countermeasure example of an antenna according to the embodiment of the present technology.

FIG. 13 is a diagram illustrating a first impedance countermeasure example of an antenna according to the embodiment of the present technology.

In this example, the transmission circuit 310 and the reception circuit 320 are respectively provided with transformers 312 and 322 to perform step-up and step-down. The transmission signal input to the transmission circuit 310 with an impedance of 50 ohms is amplified by the power amplifier 311 (power amplifier) and supplied to the transformer 312. In the transformer 312, the number of windings of the coil connected to the power supply terminal 190 of the antenna 101 is smaller than the number of windings of the other coil connected to the power amplifier 311. Therefore, the impedance of the transmission signal input to the transmission circuit 310 is matched with the impedance of the signal output to the power supply terminal 190 of the antenna 101.

Similarly, in the transformer 322, the number of windings of the coil connected to the power supply terminal 190 of the antenna 102 is smaller than the number of windings of the other coil connected to a low noise amplifier (LNA) 321. Therefore, the impedance of the signal input from the power supply terminal 190 of the antenna 102 is matched with the impedance of the reception signal output from the reception circuit 320.

For example, when the winding ratio of the transformers 312 and 322 is set to 6:1, the impedance ratio may be set to 36:1. Therefore, even a 0.15 ohm antenna may look to be 5.4 ohms when viewed from the amplifier side, and a good matching state with a 5 ohm amplifier can be achieved.

Figure 14:
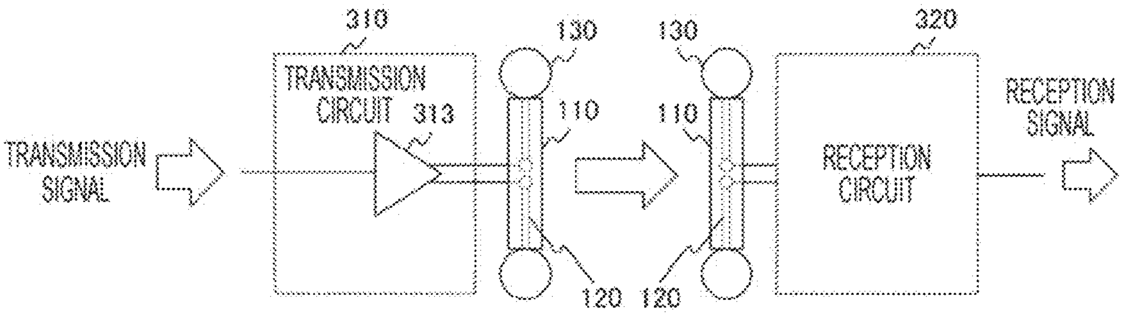
FIG. 14 is a diagram illustrating a second impedance countermeasure example of an antenna according to the embodiment of the present technology.

FIG. 14 is a diagram illustrating a second impedance countermeasure example of an antenna according to the embodiment of the present technology.

In this example, a switching-type power amplifier (power amplifier) 313 is provided in the transmission circuit 310. The power amplifier 313 may be achieved by, for example, a class D amplifier or a class E amplifier. The output of the power amplifier 313 is supplied to the power supply terminal 190 of the antenna 101.

The switching-type power amplifier 313 is a constant voltage source, and thus the impedance is ideally 0 ohms, and the power efficiency is 100%. As a specific example, the impedance of the antennas 101 and 102 is about 0.15 ohms at an operating frequency of 10 KHz, and the operation can be performed with a low impedance.

Note that, here, an example in which the transformers 312 and 322 and the power amplifier 313 are provided in the transmission circuit 310 or the like has been described; however, these may be configured as a part of the antenna 101 or 102.

[Structure of Sheath Portion]

In the above-described embodiment, a columnar shape extending in a direction connecting between the pair of electrodes 130 is assumed as the structure of the sheath portion 110. However, various modifications are conceivable as the structure of the sheath portion 110 as described below.

Figure 15:
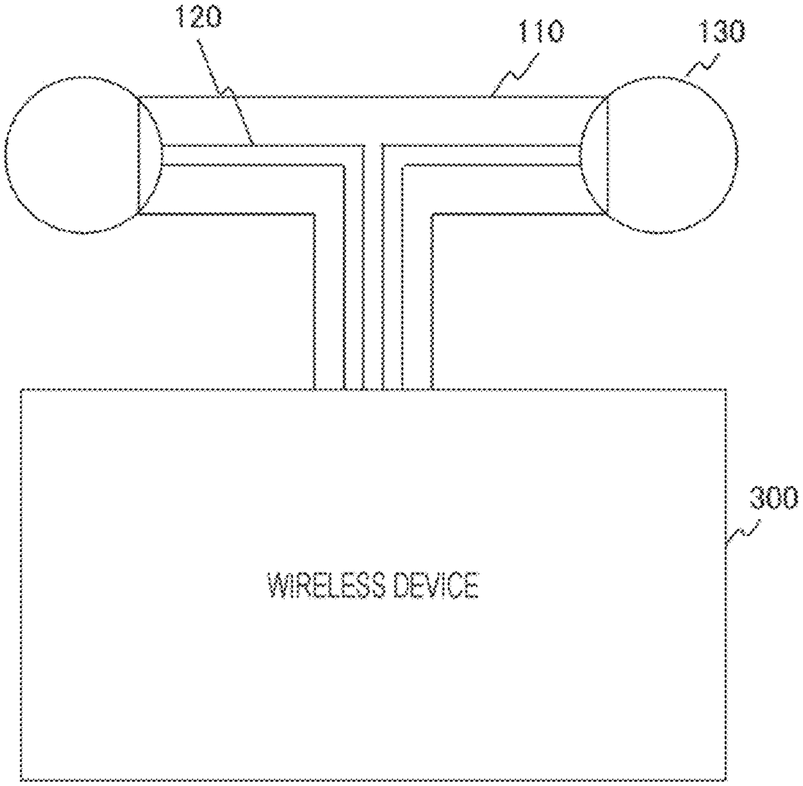
FIG. 15 is a diagram illustrating another example of a structure of a sheath portion 110 according to the embodiment of the present technology.

FIG. 15 is a diagram illustrating another example of a structure of the sheath portion 110 according to the embodiment of the present technology.

The example of the sheath portion 110 has a T-shaped structure branching in the middle of the columnar shape. Therefore, the wiring 120 is configured to be drawn into the wireless device 300. Note that the wireless device 300 may be any of the transmission circuit 310 and the reception circuit 320 described above.

Figure 16:
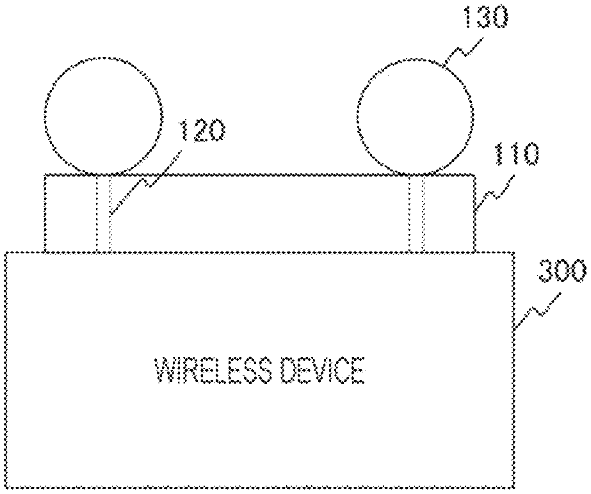
FIG. 16 is a diagram illustrating yet another example of the structure of the sheath portion 110 according to the embodiment of the present technology.
Figure 16:
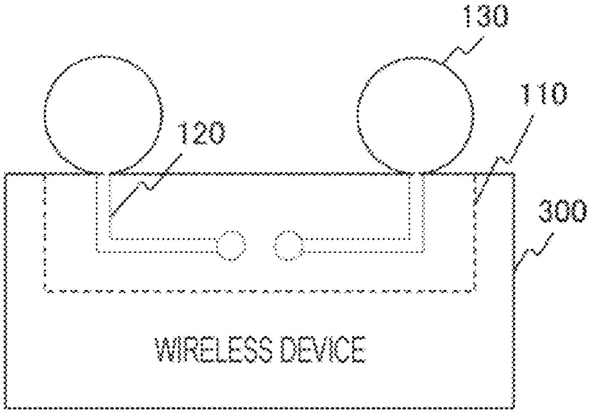

FIG. 16 is a diagram illustrating yet another example of a structure of the sheath portion 110 according to the embodiment of the present technology.

As yet another example of a structure of the sheath portion 110, as illustrated in a of FIG. 16, the sheath portion 110 may be arranged so as to be attached to the wireless device 300, and the wiring 120 may be connected to the wireless device 300 so as to penetrate the sheath portion 110.

In addition, as illustrated in b of FIG. 16, configuration may be such that the entire sheath portion 110 is incorporated in the wireless device 300.

As described above, with the present embodiment of the present technology, the transmission characteristics in the antenna for wireless communication via the lossy medium may be improved by providing the exposed electrode 130 at the end of the sheath portion 110 enclosing the wiring 120.

Note that the embodiment described above is an example for embodying the present technology, and the matters in the embodiment and the matters used to specify the invention in the claims have a corresponding relationship. Similarly, the matters specifying the invention in the claims and matters having the same names in the embodiments of the present technology have correspondence relationships. However, the present technology is not limited to the embodiment, and can be embodied by applying various modifications to the embodiment without departing from the gist thereof.

Note that the effects described in this specification are merely examples and are not limited, and additional effects may be present.

Note that the present technology may also have a following configuration.

(1) An antenna including at least one pair of electrodes, and a sheath portion enclosing wiring that electrically connects each of the at least one pair of electrodes and a corresponding power supply terminal; in which a minimum diameter of the electrode is larger than a width of the wiring.

(2) The antenna described in (1) above, in which a distance between the at least one pair of electrodes is longer than the minimum diameter of the electrode.

(3) The antenna described in (1) or (2) above, in which each of the at least one pair of electrodes has a substantially spherical shape.

(4) The antenna described in (1) or (2) above, in which each of the at least one pair of electrodes has a substantially spheroidal shape.

(5) The antenna described in (1) or (2) above, in which each of the at least one pair of electrodes has a substantially polyhedral shape.

(6) The antenna described in any one of (1) to (5) above, in which the sheath portion has a columnar shape extending in a direction connecting the at least one pair of electrodes.

(7) The antenna described in (6) above, in which the sheath portion has a shape branching from the columnar shape.

(8) The antenna described in any one of (1) to (7) above, in which the sheath portion includes air therein.

(9) The antenna described in any one of (1) to (7) above, in which the sheath portion includes pure water therein.

(10) The antenna described in any one of (1) to (7) above, in which the sheath portion includes a material therein having conductivity of less than 1 S/m.

(11) The antenna described in any one of (1) to (10) above, in which each of the at least one pair of electrodes includes a coating film on a surface thereof.

(12) The antenna described in (11) above, in which a magnitude of impedance at an operating frequency between each of the at least one pair of electrodes and an external medium is smaller than an impedance in a case where the coating film is not included.

(13) The antenna described in any one of (1) to (12) above, in which each of the at least one pair of electrodes includes a material having conductivity of less than 1 S/m therein.

(14) The antenna described in any one of (1) to (13) above, in which each of the at least one pair of electrodes includes a cavity therein.

(15) The antenna described in (14) above, in which each of the at least one pair of electrodes includes at least one hole penetrating the cavity.

(16) The antenna described in any one of (1) to (15) above further including a transformer in which a number of windings of a coil connected to the power supply terminal is smaller than a number of windings of another coil.

(17) The antenna described in any one of (1) to (15) above further including a switching-type power amplifier connected to the power supply terminal.

REFERENCE SIGNS LIST

101, 102 Antenna
110 Sheath portion
120 Wiring
130 Electrode
138 Cavity
139 Hole
190 Power supply terminal
300 Wireless device
310 Transmission circuit
311, 313 Power amplifier
312 Transformer
320 Reception circuit
321 Low Noise Amplifier (LNA)
322 Transformer
611, 612 Inductance
621, 622, 631, 632 Resistance
641, 642 Capacitance

The invention claimed is:

1. An antenna comprising:
a first pair of electrodes, and
a first sheath portion enclosing first wiring that electrically connects each of the first pair of electrodes and a corresponding first pair of power supply terminals;
wherein a minimum diameter of each of the first pair of electrodes is larger than a width of the first wiring, and
wherein a center point of each of the first pair of electrodes and a center axis of a part of the first wiring are arranged on a first common line, and
wherein the first sheath portion is configured to extend substantially along the first common line.

2. The antenna according to claim 1, wherein
a distance between the first pair of electrodes is longer than a minimum diameter of each of the first pair of electrodes.

3. The antenna according to claim 1, wherein
each of the first pair of electrodes has a substantially spherical shape.

4. The antenna according to claim 1, wherein
each of the first pair of electrodes has a spheroidal shape.

5. The antenna according to claim 1, wherein
each of the first pair of electrodes has a polyhedral shape.

6. The antenna according to claim 1, wherein
the first sheath portion includes air therein.

7. The antenna according to claim 1, wherein
the first sheath portion includes pure water therein.

8. The antenna according to claim 1, wherein
the first sheath portion includes a material therein having conductivity of less than 1 S/m.

9. The antenna according to claim 1, wherein
each of the first pair of electrodes includes a coating film on a surface thereof.

10. The antenna according to claim 9, wherein
a magnitude of impedance at an operating frequency between each of the first pair of electrodes and an external medium is smaller than an impedance in a case where the coating film is not included.

11. The antenna according to claim 1, wherein
each of the first pair of electrodes includes a material therein having conductivity of less than 1 S/m.

12. The antenna according to claim 1, wherein
each of the first pair of electrodes includes a cavity therein.

13. The antenna according to claim 12, wherein
each of the first pair of electrodes includes at least one hole penetrating the cavity.

14. The antenna according to claim 1, further comprising a transformer in which a number of windings of a coil connected to the first pair of power supply terminals is smaller than a number of windings of another coil.

15. The antenna according to claim 1, further comprising a switching-type power amplifier connected to the first pair of power supply terminals.

16. The antenna according to claim 1, wherein a center axis of the first wiring is arranged on the first common line.

17. The antenna according to claim 1, further comprising
a second pair of electrodes; and
a second sheath portion enclosing second wiring that electrically connects each of the second pair of electrodes and a corresponding second pair of power supply terminals,
wherein a minimum diameter of each of the second pair of electrodes is larger than a width of the second wiring,
wherein a center point of each of the second pair of electrodes and a center axis of the second wiring are arranged on a second common line that is orthogonal to the first common line,
wherein the second sheath portion is configured to extend substantially along the second common line,
wherein a distance between the second pair of electrodes is longer than a minimum diameter of each of the second pair of electrodes, and
wherein each of the second pair of electrodes has one of a substantially spherical shape, a spheroidal shape or a polyhedral shape.

18. The antenna according to claim 17, wherein a center axis of the second sheath portion is arranged on the second common line.

* * * * *